United States Patent
Loffink et al.

(10) Patent No.: US 7,383,454 B2
(45) Date of Patent: Jun. 3, 2008

(54) SYSTEM AND METHOD FOR BLADE INFORMATION HANDLING SYSTEM POWER INVENTORY

(75) Inventors: John S. Loffink, Austin, TX (US); Michael A. Brundridge, Georgetown, TX (US); Mukund P. Khatri, Austin, TX (US); Timothy Lambert, Austin, TX (US); Pedro Lopez, Austin, TX (US); Jaydev Reddy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 11/405,967

(22) Filed: Apr. 18, 2006

(65) Prior Publication Data

US 2007/0245162 A1   Oct. 18, 2007

(51) Int. Cl.
*G06F 1/00*     (2006.01)
*G06G 11/30*    (2006.01)

(52) U.S. Cl. ...................................... 713/300; 713/340
(58) Field of Classification Search ................ 713/300, 713/340
See application file for complete search history.

(56) References Cited

U.S. PATENT DOCUMENTS

| | | | | |
|---|---|---|---|---|
| 6,477,388 B1* | 11/2002 | Schmutz | ..................... | 455/522 |
| 2004/0030944 A1* | 2/2004 | Barr et al. | .................. | 713/400 |
| 2004/0044914 A1* | 3/2004 | Gedeon | ...................... | 713/300 |
| 2006/0136754 A1* | 6/2006 | Liu et al. | ..................... | 713/300 |
| 2006/0140211 A1 | 6/2006 | Huang et al. | ............... | 370/466 |
| 2006/0155517 A1 | 7/2006 | Dobbs et al. | ................ | 702/188 |
| 2006/0206730 A1* | 9/2006 | Cartes et al. | ............... | 713/300 |
| 2006/0230299 A1* | 10/2006 | Zaretsky et al. | ............ | 713/320 |
| 2007/0067657 A1* | 3/2007 | Ranganathan et al. | ...... | 713/320 |
| 2007/0083774 A1* | 4/2007 | Baurer et al. | ............... | 713/300 |
| 2007/0118771 A1* | 5/2007 | Bolan et al. | ................ | 713/300 |
| 2007/0143635 A1* | 6/2007 | Hughes et al. | .............. | 713/300 |

\* cited by examiner

*Primary Examiner*—Thomas Lee
*Assistant Examiner*—Ji H Bae
(74) *Attorney, Agent, or Firm*—Hamilton & Terrile, LLP; Robert W. Holland

(57) ABSTRACT

A blade information handling system server prevents excess power demand from blade information handling systems by inventorying the power consumption of each blade information handling system before startup. Another power consumption inventory performed after startup ensures an accurate power consumption inventory for making subsequent startup decision. The baseboard management controller performs the first power consumption inventory with the processing components of the blade information handling system in an off state. The power inventory is communicated to the chassis management controller to obtain authorization to startup based on the power available at the chassis. The second power inventory is performed with the processing components in an on state and forwarded to the chassis management controller for use in subsequent determinations of power available at the chassis.

15 Claims, 3 Drawing Sheets

SYSTEM AND METHOD FOR BLADE INFORMATION HANDLING SYSTEM POWER INVENTORY

BACKGROUND OF THE INVENTION

1. Field of the Invention

The present invention relates in general to the field of information handling system power management, and more particularly to a system and method for blade information handling system power inventory in a reduced power consumption state.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Often, especially with larger enterprises, large numbers of information handling servers perform functions critical to enterprise success, such as interfacing with customers or coordinating enterprise operations. Enterprises typically have difficulty placing large numbers of server information handling systems in a common location due to the physical footprint of the systems as well as power and cooling constraints. One solution increasingly selected by enterprises is the installation of blade servers. A blade server generally has a chassis with slots sized to accept ten or more blade information handling system. Each blade information handling system is essentially a motherboard with a processor, storage and network interfaces that engage in the blade server chassis slot; however, the blade information handling systems share common support resources, such as power and cooling resources. The use of a single set of power and cooling resources in a chassis reduces the footprint of the chassis. Further footprint efficiencies are gained by the use of a single housing instead of a separate housing for each blade. A chassis management controller (CMC) manages the chassis-level subsystems while a baseboard management controller (BMC) on each blade manages the physical operation of the blade, such temperature sensors and application of power. Remote management through the CMC and BMC are available through in band and out of band communication.

One difficulty associated with blade servers is ensuring that the power available through a blade chassis is sufficient for all blade information handling systems that are loaded in the chassis. A typical blade chassis has a longevity of five or more years. Over the time that a blade chassis is deployed, empty slots are sometimes filled and existing blade information handling systems are sometimes replaced with new blades or upgraded with new components. Often, newer information handling systems and components have greater power needs than older components. To avoid overburdening a blade chassis power supply, an estimated power consumption of blade information handling systems is applied that will minimize disruption in operations. Typically, a power consumption inventory is made at power up of each blade information handling system. However, if the blade chassis has an upgraded, replaced or new blade information handling system then powering up the blade information handling system to take the power inventory can cause the blade chassis to exceed its power capacity.

SUMMARY OF THE INVENTION

Therefore a need has arisen for a system and method which estimates blade information handling system power consumption before power up.

In accordance with the present invention, a system and method are provided which substantially reduce the disadvantages and problems associated with previous methods and systems for estimating blade information handling system power consumption. A preliminary power consumption inventory is performed before startup of a blade information handling system to confirm that adequate blade chassis power is available to support operation of the blade information handling system. A final power consumption inventory is performed after startup of the blade information handling system to provide a more accurate basis for determining whether adequate chassis power exists to support subsequent startups of other blade information handling systems in the chassis.

More specifically, a blade information handling system server chassis supports operation of plural blade information handling systems with a common power source managed by a chassis management controller. A baseboard management controller on each blade information handling system performs a preliminary power inventory of processing components of the blade information handling system with the processing components in an off state. The preliminary power consumption inventory is communicated to the chassis management controller to obtain authorization for startup. After startup of the blade information handling system, a final power consumption inventory is performed with the blade information handling system processing components in an on state. The final power consumption inventory is communicated to the chassis management controller for use in determinations of whether to authorize subsequent startups of other blade information handling systems at the chassis. Since authorization for startup based is more likely on the final versus the preliminary power consumption inventories, if authorization to startup is denied to a blade information handling system, another startup request is communicated by the blade information handling system after a predetermined timeout.

The present invention provides a number of important technical advantages. One example of an important technical advantage is that an estimate of power consumption by a blade information handling system is performed with the BMC in a minimal power consumption state, thus reducing the risk that the power capacity of the blade chassis will be inadvertently exceeded. A basic power consumption estimate is available even for upgraded or new blade information handling systems without powering up the processing components on the blade information handling system. A "worst case" estimate made by the BMC with processing components inactive allows blade start-up for a subsequent fine tuned power consumption determination with the blade processing components in an operating state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A blade information handling system server applies a preliminary power inventory performed with processing components in an off state to avoid excess power demand on startup and a final power inventory with processing components in an on state to ensure full use of power resources. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
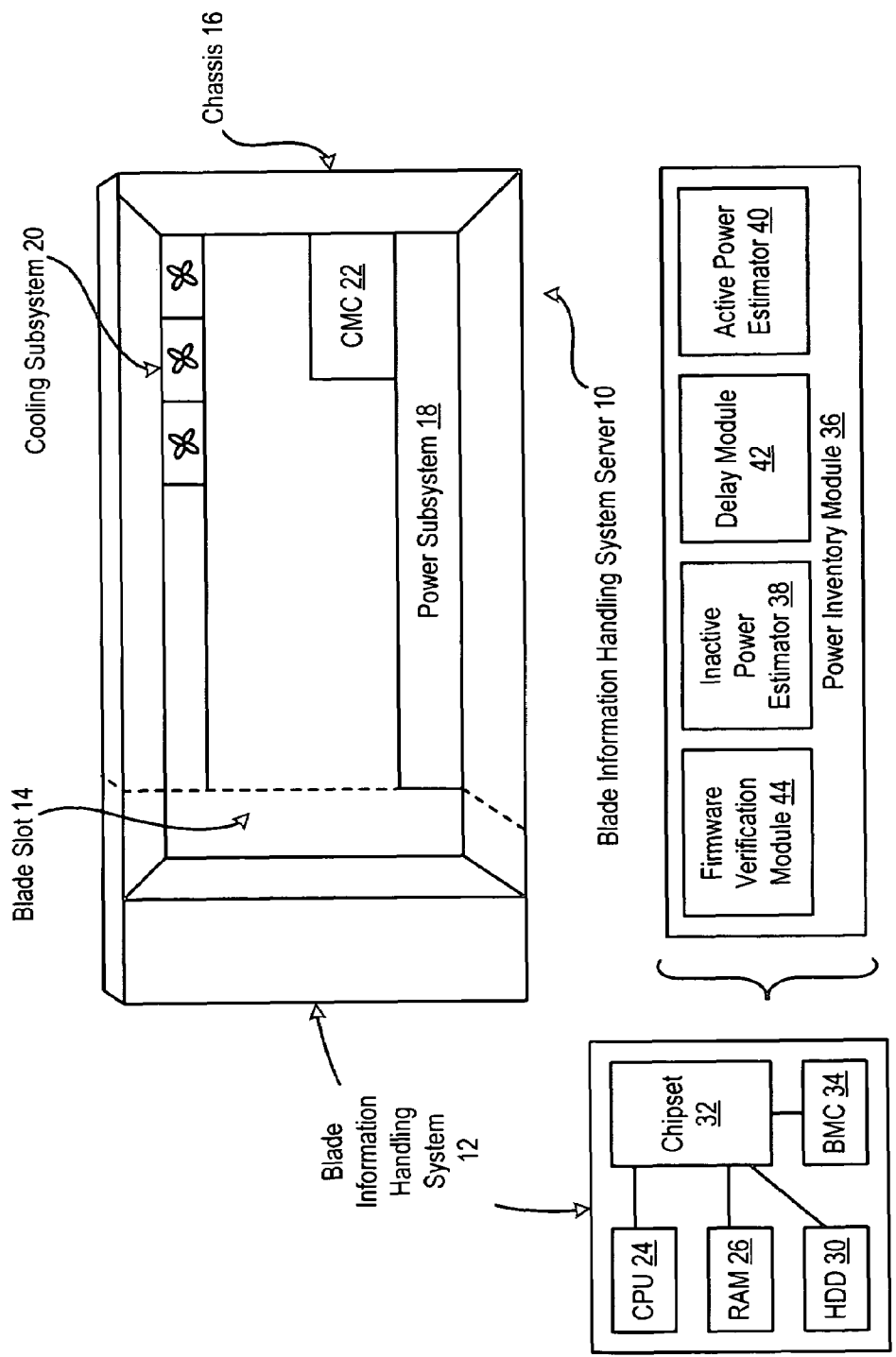
FIG. 1 depicts a block diagram of a blade information handling system server using dual power consumption inventories to manage power.

Referring now to FIG. 1, a block diagram depicts a blade information handling system server 10 using dual power consumption inventories to manage power. Blade information handling system server 10 has plural blade information handling systems 12 disposed in blade slots 14 of a chassis 16. A common power subsystem 18 and cooling subsystem 20 support blade information handling systems 12 through slots 14 under the management of a chassis management controller 22. Blade information handling systems 12 have plural processing components to process information, such as one or more CPUs 24, RAM 26, one or more hard disk drives 30 and a chipset 32. A baseboard management controller 34 associated with each blade information handling system 12 manages system operations and interactions with chassis management controller 22. For instance, remote out of band control over each blade information handling system 12 is supported through communications of chassis management controller 22 and baseboard management controller 34. Each baseboard management controller 22 starts up and shuts off its associated blade information handling system 12 based on authorization from chassis management controller 22.

In order to avoid excess power consumption by the startup of a blade information handling system 12, a power inventory module 36 performs power consumption inventories and communicates the power consumption inventories to chassis management controller 22. Chassis management controller 22 applies the power consumption inventories communicated by each blade information handling system 12 to authorize or deny requests to startup. An inactive power estimator 38 performs the preliminary power consumption inventory with the processing components of its blade information handling system 12 in an off state. This first power consumption inventory provides an estimate of the greatest expected power consumption based upon incomplete information retrievable by baseboard management controller 34 with the processing components in the off state. If the chassis has power available to support operations within the first power consumption inventory, then chassis management controller 22 authorizes startup. After startup, an active power estimator 40 performs a final power consumption inventory with the processing components of its blade information handling system 12 in an on state. This second power consumption inventory provides a more complete estimate of the greatest expected power consumption based upon information retrievable by baseboard management controller 34 with the processing components in the on state. The more accurate final power consumption inventory, which generally is less than the preliminary power consumption inventory, is used by chassis management controller 22 to determine power available for subsequent startup requests.

Because a blade information handling system server 10 may have multiple blade information handling systems 12, a difficulty might arise if plural preliminary power inventories are sent in synch to chassis management controller 22. For instance, available power will appear less based on preliminary power inventories so that a blade information handling system may be denied authorization to startup when, in fact, adequate chassis power will be available after the final power inventories are reported. A delay module 42 responds to a denial of a request to startup from chassis management controller 22 by setting a predetermined timeout and then re-communicating the request to startup with the preliminary power inventory to chassis management controller 22. If, during the timeout, another blade information handling system 12 reported a final power consumption inventory that increased the available chassis power enough, then chassis management controller 22 will approve the startup request. Another difficulty that can arise is that firmware corruption within 34 baseboard management controller might prevent the performance of the preliminary power consumption inventory. A firmware verification module 44 analyzes the firmware for corruption, such as might occur if a firmware update was only partially completed. If the firmware is corrupted, a worst case power consumption inventory value is provided to chassis management controller 22. Once startup of the blade information handling system is approved, the corrupt firmware is corrected.

Figure 2:
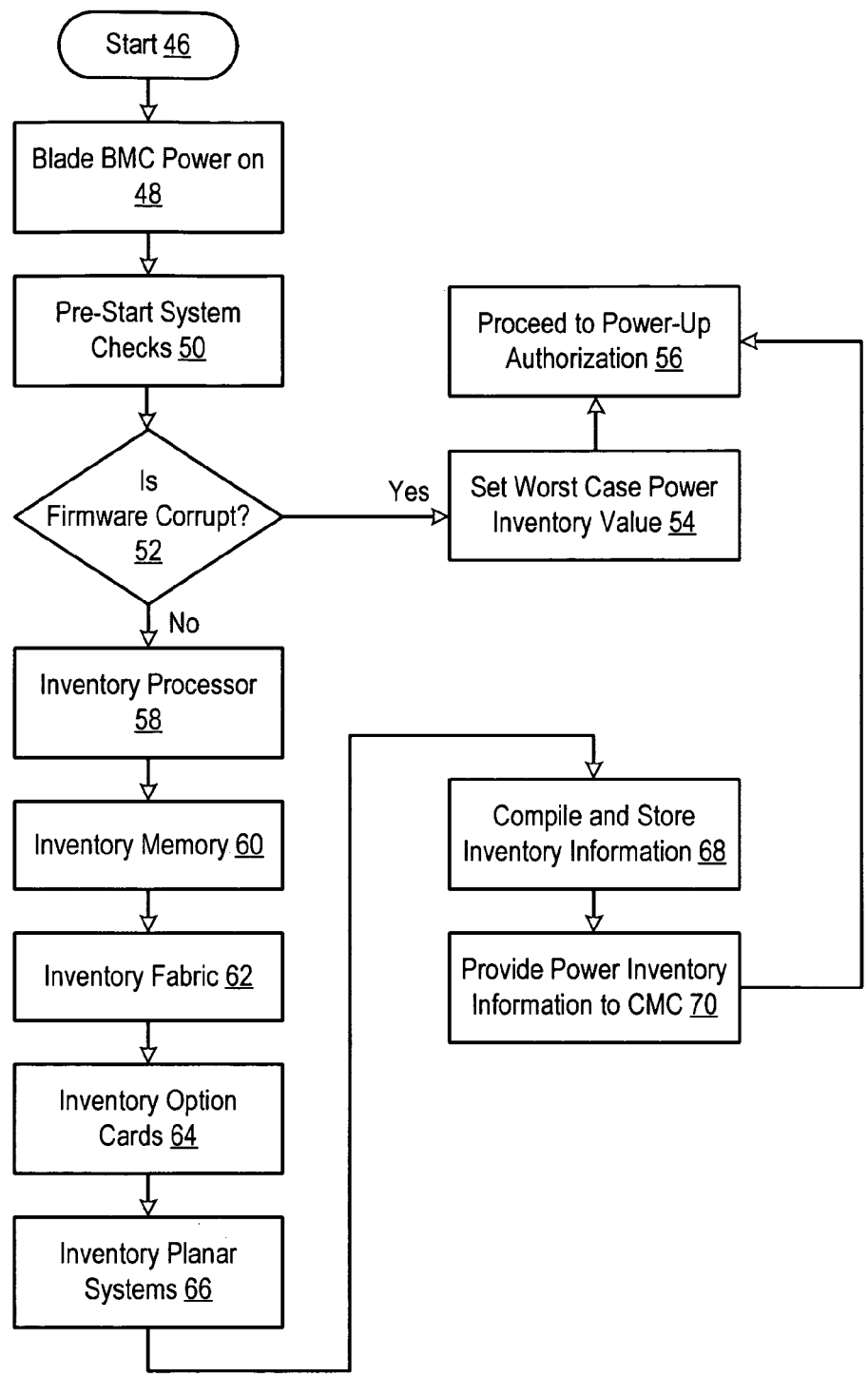
FIG. 2 depicts a flow diagram of a process for performing a power inventory with processing components in an off state.

Referring now to FIG. 2, a flow diagram depicts a process for performing a power inventory with processing components in an off state. The process starts at step 46 and proceeds to step 48 for power up of the blade baseboard management controller. At step 50, pre-start checks are performed to prepare for blade startup, such as checking the AC recovery mode, wake on LAN, real time clock wake, whether a manual button press initiated startup, and whether a remote IPMI request initiated startup. Generally, the baseboard management controller receives power and automatically turns on if power is applied to the blade server chassis. With a blade information handling system's baseboard management controller on and the processing components off, the power draw from the blade is at a minimal value. Performing the power inventory depends upon proper operation of power inventory firmware running on the baseboard management controller. At step 52 a determination is made of whether the firmware is corrupt at POST of the baseboard management controller and, if so the process continues to step 54 without performing a power consumption inventory. At step 54 a predetermined worst case power consumption inventory value is assigned and the process continues to step 56 to request a power-up authorization from the chassis management controller. If authorization to startup is approved, the firmware is updated with in band communication, and if authorization is denied then the firmware is updates with slower out of band communication.

If at step 52 the firmware is not corrupt, the process continues to step 58 to inventory the CPUs of the blade information handling system. With only the baseboard management controller powered, only the presence or absence of CPUs can be detected, so the baseboard management controller detects the number of CPUs and multiplies the detected number against a worst case power consumption number per CPU per type of blade information handling system. At step 60, memory is inventoried through interaction with the memory SPD to obtain DIMM vendor and size. DIMM vendor and size information available with the memory in an off state provides a basis for achieving an accurate power consumption estimate. At step 62, fabric mezzanines are inventoried by counting the number present and applying a nominal power consumption value, such as 15 Watts. Since fabric mezzanine power consumption is minimal, inventory of presence provides an adequate power consumption estimate. At step 64, option cards are detected, such as SAS IOC modules and inventoried by presence. At step 66, a value is retrieved for the planar power consumption at the blade mother board level, including a value for each hard disk drive that is present. At step 68, the power consumption of the processing components is compiled to provide a preliminary power consumption inventory. At step 70 the preliminary power consumption inventory is provided to the chassis management controller so that, at step 56, the process can continue to request a power-up authorization for the blade information handling system.

Figure 3:
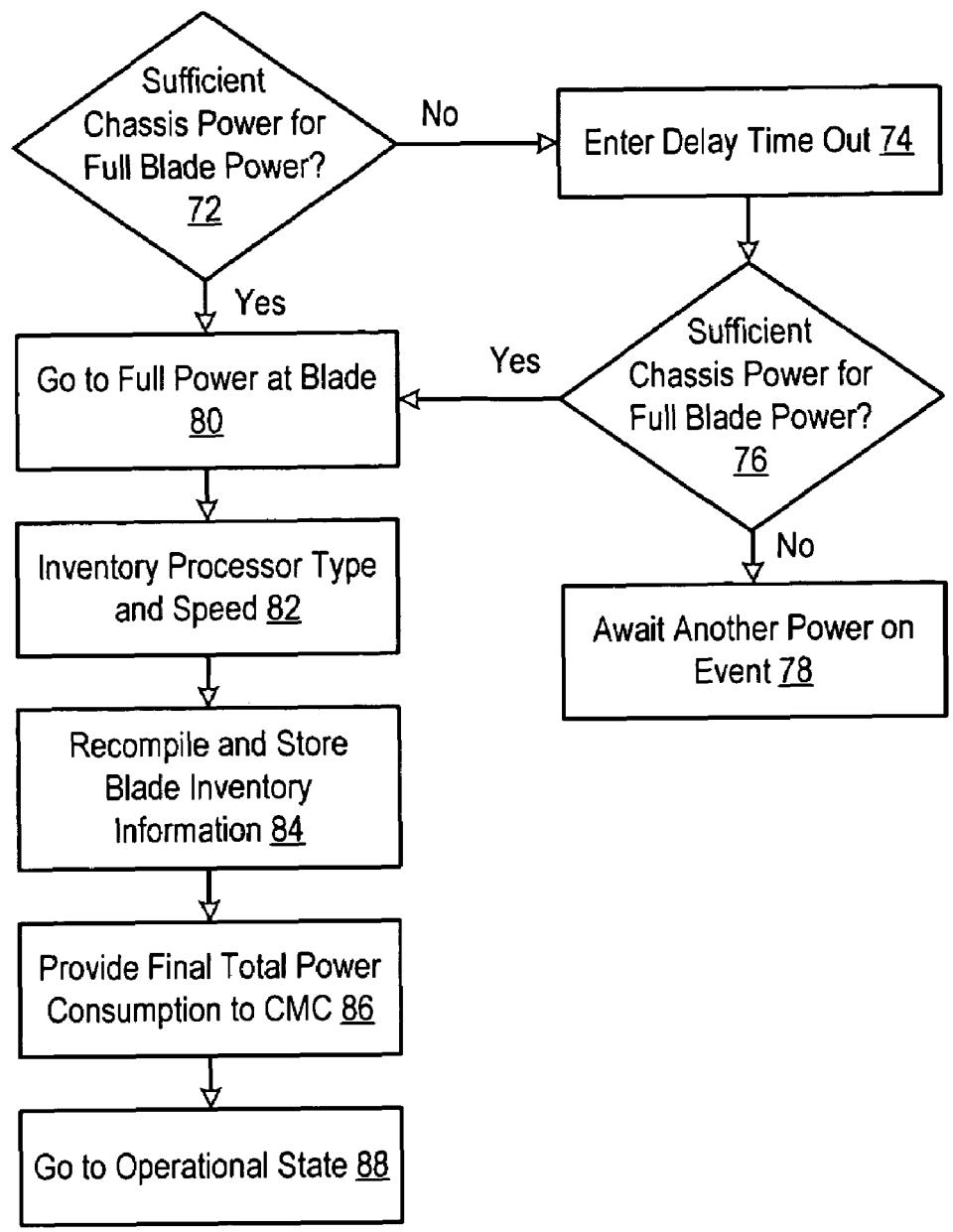
FIG. 3 depicts a flow diagram of a process for performing a power inventory with processing components in an on state.

Referring now to FIG. 3, a flow diagram depicts a process for performing a power inventory with processing components in an on state. The process begins at step 72 with a determination at the chassis management controller of whether sufficient power exists at the chassis to support startup of the blade information handling system. For instance, the chassis management controller subtracts the power inventories of blades in an on state from the available chassis power and authorizes startup if the blades' preliminary power inventory is less than the available power. If sufficient power is not present to authorize startup, the process continues to step 74 to enter a predetermined time delay and then to step 76 to again request authorization for startup. The time delay offers an opportunity for other blades in the startup process to complete a final power consumption inventory and provide that value to the chassis management controller. Based on a reduction for the final power consumption inventory relative to the preliminary power consumption inventory for other blades in the startup process, the chassis management controller may have adequate chassis power available to authorize startup. If not, the process ends at step 78 with the blade idle until another power on event occurs.

If at step 72 the chassis management controller authorizes startup, the process continues to step 80 at which the baseboard management controller initiates startup of its associated blade. At step 82, the CPUs are inventoried in an on state for type and speed, which allows a more accurate estimate of maximum power consumption. The CPU power consumption inventory in the on state should reduce the final power consumption inventory since a worst case value is used to estimate CPU power consumption in the off state for the preliminary power consumption inventory. At step 84, the power consumption inventory is re-compiled with the updated CPU power consumption estimate and, at step 86, the final power consumption inventory value is provided to the chassis management controller. At step 88, the blade information handling system enters an operational state with the chassis management controller having the final power consumption inventory on which to base determinations for subsequent blade information handling system startup requests.

Although the present invention has been described in detail, it should be understood that various changes, substitutions and alterations can be made hereto without departing from the spirit and scope of the invention as defined by the appended claims.

What is claimed is:

1. A blade information handling system server comprising:
    a chassis having a power supply associated with plural blade slots, each blade slot operable to accept a blade information handling system and apply power to the blade information handling system;
    a chassis management controller interfaced with the power supply and the slots and operable to control the application of power at a slot;
    one or more blade information handling systems disposed in the slots and interfaced with the chassis management controller, each blade information handling system having an associated baseboard management controller operable to manage startup to an on state and shut down to an off state of the associated blade information handling system; and
    a power inventory module running on each baseboard management controller, the power inventory module operable to perform a first power inventory of the associated blade information handling system in the off state and a second power inventory in the on state;
    wherein the baseboard management controller is further operable to check for firmware corruption and, if firmware corruption is detected, to communicate a predetermined power inventory as the first power inventory.

2. The blade information handling server of claim 1 wherein the power inventory module is further operable to communicate the first power inventory to the chassis management controller to obtain permission to startup the associated blade information handling system to the on state.

3. The blade information handling system server of claim 2 wherein the power inventory module is further operable to communicate the second power inventory to the chassis management controller for use in power management of the chassis.

4. The blade information handling system server of claim 2 wherein the power inventory module is farther operable to receive a refusal for the startup from the chassis management controller, to wait for a predetermined time and to re-communicate the first power inventory to the chassis management controller to obtain permission to startup after the predetermined time.

5. The blade information handling system server of claim 1 wherein the first power inventory comprises the number of processors present in the blade information handling system multiplied by a preset value.

6. The blade information handling system server of claim 5 wherein the second power inventory comprises a determination based on the type and speed of the processors.

7. A method for information handling system power management through a chassis that provides power to plural information handling systems, the method comprising:
    attempting to inventory hardware components of an information handling system for power consumption while the hardware components are in an off state, the inventorying performed with a management processor associated with the information handling system;
    detecting a failure associated with the management processor;
    assigning a predetermined inventoried power consumption for use by a chassis management controller;
    using the chassis management controller to compare the predetermined inventoried power consumption with available power at the chassis to authorize startup of the information handling system;
    initiating startup of the information handling system with the management processor;
    re-inventorying the hardware components for power consumption while the hardware components are in an on state; and
    communicating the re-inventoried power consumption to the chassis management controller.

8. The method of claim 7 wherein the chassis comprises a blade server chassis, the information handling system comprises a blade information handling system and the management processor comprises a baseboard management controller.

9. The method of claim 7 wherein inventorying comprises counting the number of processors loaded on the information handling system and wherein re-inventorying comprises analyzing the type and speed of the processors running on the information handling system.

10. The method of claim 7 wherein comparing with the chassis management controller further comprises:
    determining that the chassis lacks power to authorize startup of the information handling system;
    denying authorization for startup of the information handling system;
    waiting a predetermined time; and
    re-communicating the inventoried power consumption to the chassis management controller to authorize startup of the information handling system.

11. A system for information handling system power management through a chassis that provides power to plural information handling systems, the system comprising:
    an inactive power estimator operable to inventory power consumption associated with processing components of an information handling system while the processing components are in an inactive state and to communicate the inventoried power consumption to a chassis management controller to obtain authorization to startup the processing components;
    an active power estimator operable to inventory power consumption associated with processing components with the processing components in an active state and to communicate the inventoried power consumption to a chassis management controller for use in managing chassis power; and
    a firmware verification module interfaced with the inactive power estimator and operable to detect firmware corruption and request authorization to startup with a predetermined power inventory value.

12. The system of claim 11 further comprising a delay module interfaced with the inactive power estimator, the delay module operable to set a predetermined timeout if authorization to startup is denied and to re-communicate the inventoried power consumption to the chassis management controller after the timeout to obtain authorization to startup the processing components.

13. The system of claim 11 wherein the information handling system comprises a blade information handling system having a baseboard management controller, the inactive power estimator and active power estimator residing on the baseboard management controller.

14. The system of claim 11 wherein the inactive power estimator inventoried power consumption comprises the number of CPUs on the information handling system multiplied by a predetermined value.

15. The system of claim 14 wherein the active power estimator inventoried power consumption comprises power consumption based on the type and speed of the CPUs.

* * * * *